United States Patent [19]

Derin

[11] Patent Number: 4,781,070

[45] Date of Patent: Nov. 1, 1988

[54] FLOW METER

[76] Inventor: Stephen Derin, 7224 Mardan Rd., Greenbelt, Md. 20770

[21] Appl. No.: 893,945

[22] Filed: Aug. 6, 1986

[51] Int. Cl.⁴ .............................................. G01F 1/07
[52] U.S. Cl. .............................. 73/861.72; 73/861.71
[58] Field of Search .......... 73/861.71, 861.72, 861.61, 73/861.47, 861.73, 232; 340/606

[56] References Cited

U.S. PATENT DOCUMENTS

| | | | |
|---|---|---|---|
| 2,804,771 | 9/1957 | Brown | 73/861.72 |
| 3,206,978 | 9/1965 | Aronow | 73/861.72 |
| 3,584,508 | 6/1971 | Shiba | 73/861.72 |
| 3,693,437 | 9/1972 | Shiba | 73/861.71 |
| 3,719,079 | 3/1973 | Howell | 73/861.71 |
| 3,805,612 | 4/1974 | Shiba | 73/861.61 |
| 3,965,734 | 6/1976 | Ward et al. | 73/861.71 |
| 4,130,017 | 12/1978 | Benedict et al. | 73/861.61 |
| 4,612,814 | 9/1986 | Campman | 73/861.72 |

Primary Examiner—Joseph A. Orsino, Jr.
Assistant Examiner—Brent A. Swarthout
Attorney, Agent, or Firm—Philip J. Ostaszewski

[57] ABSTRACT

Apparatus for measuring mass flow of a fluid in a conduit by which the fluid passes through a moveable chamber which establishes a constant velocity profile of the flowing fluid at the outlet opening of the chamber. Measurement of momentum force at the control surface defined by the outlet opening of the chamber permits accurate mass flow measurements by application of the momentum equation.

15 Claims, 4 Drawing Sheets $F = F_1$ $F = 1.083 F_1$ $F = 1.143 F_1$ $F = 1.250 F_1$ $F = 1.333 F_1$ $F = 1.500 F_1$

FLOW METER

This invention relates to mass flow meters by which momentum forces of a flowing fluid are measured to calculate mass flow parameters.

BACKGROUND OF THE INVENTION

Mass flow meters utilizing the general principle of angular or linear momentum have been used in the past as disclosed by the following references.

| U.S. Pat. No. | Name | Date |
|---|---|---|
| 1,401,299 | Wohlenberg | 12-21 |
| 2,804,771 | Brown | 09-57 |
| 3,049,919 | Roth | 08-62 |
| 3,206,978 | Aronow | 09-65 |
| 3,429,181 | Shiba | 02-69 |
| 3,538,769 | Shiba | 11-70 |
| 3,584,508 | Shiba | 06-71 |
| 3,693,437 | Shiba | 09-72 |

These references disclose meters that accomplish mass flow measurements by application of the momentum equation over one or more control surfaces which are assumed to have a constant, or nearly constant, velocity profile for the flowing fluid over the entire control surface or surfaces of interest. The velocity profile of a flowing fluid in a mass flow meter is dependent upon many factors, such as conduit disturbances upstream of the meter, curvature of the fluid path within the meter or immediately upstream of the meter's inlet opening, roughness of the boundary material of the fluid path, heat transfer characteristics of the fluid and the meter's structure, viscosity of the fluid, Reynolds Number of the fluid, and so forth. The necessity of having a velocity profile of the flowing fluid as constant as possible at each control surface of interest has been recognized in the prior art (Wohlenberg No. 1,401,299), but the prior art does not teach the utilization of the meter's structure itself for establishing these constant velocity profiles. Usually, the condition of constant velocity over a control surface of interest, if addressed in the prior art, is accomplished by providing as ideal flow conditions as possible external to the meter. In some applications, providing ideal flow conditions external to the meter is not possibile or practicable.

The meters in the above references measure the mass or volumetric flow of a fluid passing through them based upon application of the momentum equation. An essential element of the momentum equation is evaluation of the surface integral:

$$F = \int\int \rho V \cdot (V \cdot dA)$$

where F is the vector components of force being measured, $\rho$ is the scalar density of the flowing fluid, V is the velocity vector of the fluid measured relative to a control volume and dA is the differential surface area vector of the selected control volume. To accurately calculate F, it is essential to know the characteristics of the velocity vector at the control surface where the momentum equation is applied. Without utilizing structure in the meter itself, as in the present invention, which generates an essentially constant velocity profile of the flowing fluid at the control surface where the momentum equation is applied, there is no certainty of what the velocity profile will be at that surface area. If, however, a constant velocity of the flowing fluid can be established over the control surface, the one-dimensional momentum equation applied over this surface area reduces to:

ti $F = \rho V^2 A$ assuming $\rho$ is constant. If the specific value of $\rho$ is unknown, it can be determined by other means. Parameter A is known since it is the area of the control surface across which the fluid flows. Parameter F is determined by measurement. Therefore, parameter V, the velocity of the fluid, can be solved for as the only unknown in the above equation as:

$$V = \sqrt{F/(\rho A)}$$

Mass flow rate, Q, can then be determined from the following equation:

$$Q = \rho V A$$

The necessity of establishing a constant velocity profile of the flowing fluid when attempting to accurately measure flow by means of the momentum equation can be illustrated by examining the effects of flowing fluids with non-constant velocities on the momentum equation. FIG. 1 shows several fluid velocity profiles, each with the same mass flow rate. Velocity profiles of power law fluids were derived from equations presented on page 7-16 of Handbook of Fluid Dynamics by V. L. Streeter, 1961 edition. The force component, F, attributable to each of these profiles will be different and increasing in value when going from the constant velocity profile in FIG. 1(a) to the triangular velocity profile of FIG. 1(f), with corresponding difference in measurement of mass flow rate, Q, of approximately 22.5 percent when using the previously defined formulas. Therefore, unless the exact velocity profile of the flowing fluid is known for all flow conditions, a mass flow meter will be susceptible to large errors in flow measurement. The best method of knowing the exact velocity profile is to use a meter which establishes a constant velocity profile for all measurements, as is done by the present invention.

Wohlenberg U.S. Pat. No. 1,401,299, Brown U.S. Pat. No. 2,804,771, Roth U.S. Pat. No. 3,049,919 and Shiba U.S. Pat. No. 3,584,508 teach U-shaped mass flow meters which in general are dependent upon the velocity profiles at a minimum of two control surfaces (i.e., inlet and outlet openings). The present invention is dependent upon a minimum of one velocity profile (i.e., outlet opening). Aronow U.S. Pat. No. 3,206,978 teaches a meter with only one control surface, but does not attempt to control the velocity profile across that surface. Shiba U.S. Pat. No. 3,429,181 teaches a cup type mass flow meter but does not attempt to control velocity profile over the control surface. Shiba U.S. Pat. No. 3,538,769 teaches mainly flow meters which measure mass flow with angular momentum measurements, as opposed to linear momentum measurements. Shiba U.S. Pat. No. 3,693,437 teaches a one dimensional flow meter, as the present invention, but utilizes a Venturi tube and effect, and two control surfaces, without stucture for establishing constant velocity profiles of the flowing fluid.

SUMMARY OF THE INVENTION

A mass flow meter, which provides an essential improvement over previous mass and flow measuring devices, in that the meter includes an integral chamber which generates a constant velocity profile at its outlet. This constant velocity at the meter's outlet results in accurate application of the surface integral in a one-dimensional momentum equation and thus enables the accurate determination of mass flow.

Accordingly, an object of the invention is to provide a new and improved apparatus for measuring mass flow which, in addition to the known advantages of mass flow meters, is of simple and low cost construction and is not susceptible to errors introduced by non-constant velocity profiles of the fluid being measured.

Another object of this invention is to provide a meter which does not require calibration for different types of fluids since the velocity profile at the control surface of interest is known to be constant.

DESCRIPTION OF PREFERRED EMBODIMENT

Figure 1A:
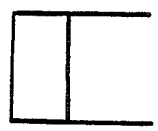
FIG. 1 illustrates the effects on the accuracy of a mass flow meter caused by deviations from a constant velocity profile.
Figure 1B:
Figure 1C:
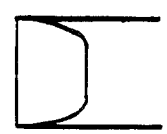
Figure 1D:
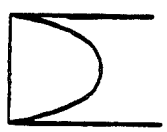
Figure 1E:
Figure 1F:

Referring to the drawings, common to all embodiments is a moveable chamber 1, of known geometry, with inlet and outlet openings, and one end connected to expandible member 3, and the other end connected to expandible member 2, at the outlet opening of chamber 1. As shown in the drawings, a meter housing 10 surrounds chamber 1 and provides connection points for various elements of the meter. In general, meter housing 10 can be any structure which is fixed relative to chamber 1. Arrows shown in the drawings indicate flow into and out from chamber 1. While chamber 1, as described in this best mode for carrying out the invention, is cylindrical in shape, other shapes of known geometry can be used, with consequential changes in construction of the meter. In general, any shape of chamber 1, with known geometry, and any number of inlet and outlet openings, may be used as long as the centerlines of all inlet openings are perpendicular to the centerlines of all outlet openings and all outlet openings are parallel to each other.

Figure 4:
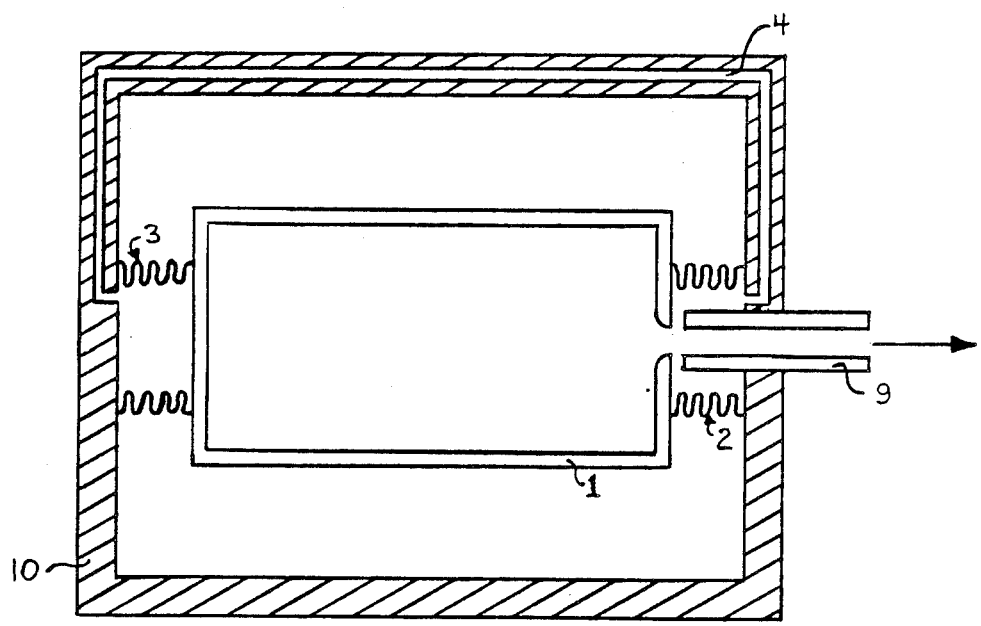
FIG. 4 is a partial vertical sectional view of a meter.

Expandible members 2 and 3 are also attached to meter housing 10 at ends opposite the attachments to chamber 1. Fluid flow between interior of expandible members 2 and 3 is allowed by fluid path 4 as shown in FIG. 4. Fluid path 4, shown integral to meter housing 10 in FIG. 4, may also be provided by interconnecting conduit. Fluid path 4 between expandible members 2 and 3 allows for balancing of fluid pressures in the direction of chamber 1 outlet flow. At each inlet opening of chamber 1, each expandible member 5 is connected at one end to its respective chamber 1 opening, and to meter housing 10 at the other end. Pressure compensating means may be provided between inlet expandible members 5 if required to balance opposed inlet flows.

Figure 3:
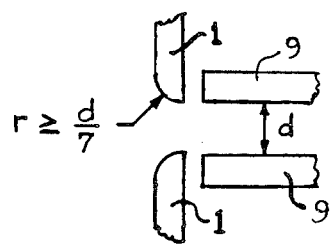
FIG. 3 is a horizontal sectional view of an outlet opening for a chamber.

In the best mode of carrying out the invention, two inlet openings of chamber 1 are diametrically opposed to each other, with centerlines of opposed inlets essentially coplanar and perpendicular to the outlet opening centerline of chamber 1. To maintain flow parallel to the centerline of the inlet openings, the surfaces of the inlet openings should be essentially square-edged and parallel to the centerline of the openings. The centerline of the outlet opening of chamber 1 is oriented essentially parallel to the gravity field when fluid density is not known and must be measured. If fluid density is known, no specific orientation of the outlet opening of chamber 1 is required. In the best mode of carrying out the invention, the outlet opening of chamber 1 is a curved funnel with a radius of curvature of at least one-seventh of the diameter of the outlet opening as shown in FIG. 3 in order to assure smooth outlet transition flow and develop a constant velocity profile of the flowing fluid at the outlet opening.

Figure 5:
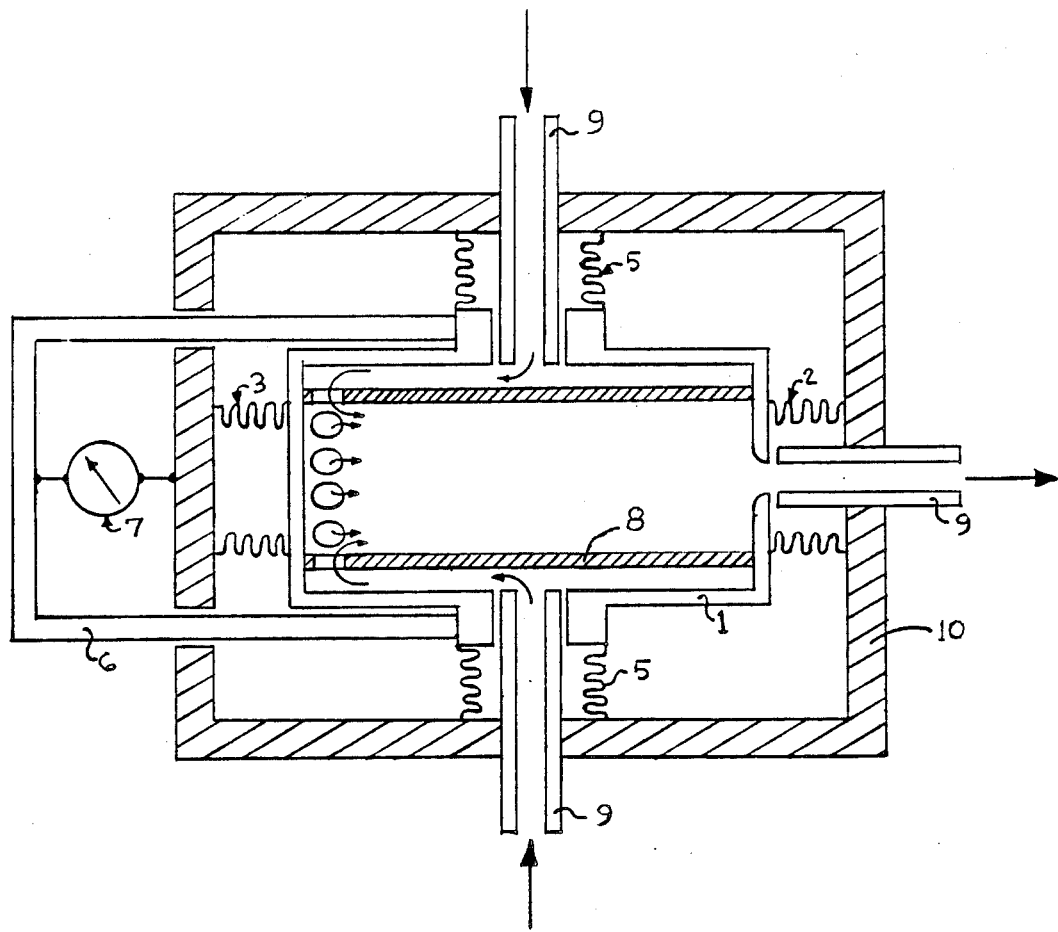
FIG. 5 is a horizontal sectional view of a meter with an inner open cylinder.

The inside diameter of cylindrical chamber 1 must be greater than the sum of twice the boundary layer thickness of the flowing fluid at the outlet end of the chamber plus the diameter of the outlet opening. This will assure a constant velocity profile at the outlet opening control surface. In some applications, an inner open cylinder 8, with outside diameter less than the inner diameter of chamber 1, and length equal to inside length of chamber 1, arranged concentrically about the centerline of the outlet opening as shown in FIG. 5 may be used to enhance the development of a constant velocity profile at the outlet opening. This open cylinder 8 may be used to enhance smooth flow within chamber 1 where, for example, it is not possible to achieve symmetrical inlet connections to the meter, or a very short overall chamber length is desireable. Openings in open cylinder 8 are provided at the end opposite the outlet opening to allow flow from chamber 1 inlet openings to chamber 1 outlet opening as shown by arrows in FIG. 5. Open cylinder 8 may also be made shorter than the inner length of chamber 1, with open cylinder 8 connected to the outlet opening end of chamber 1, concentrically about the outlet opening. When open cylinder 8 is used, its inside diameter must be greater than the sum of twice the boundary layer thickness of the flowing fluid at the outlet end of open cylinder 8 plus the diameter of chamber 1 outlet opening.

For each inlet and outlet, conduit 9, attached to meter housing 10, provides a path for fluid flow into and out from the meter. For each inlet, conduit 9 extends into its respective inlet expandible members 5 to the respective inlet opening of chamber 1. For each inlet, the distance between the outside diameter of the conduit 9 and inlet opening of chamber 1 should be the minimum required to allow unrestricted movement of chamber 1 when subjected to flow and gravity forces. For each inlet, conduit 9 extends into its respective inlet expandible members 5 to the respective inlet opening of chamber 1. For each outlet, the distance between the end of conduit 9 and outlet opening of chamber 1 should be the minimum required to allow unrestricted movement of chamber 1 when subjected to flow and gravity forces. The end of each conduit 9 associated with chamber 1 should be square-edged to maintain smooth flow transition to each inlet opening and from each outlet opening. Each conduit 9 should be concentric to the inner diameter of its respective inlet or outlet opening diameter. For each outlet, conduit 9 inside diameter is equal in diameter to or slightly larger than its respective outlet opening diameter. Each conduit 9 should have a minimum length equal to five times its inside diameter in order to establish a smooth transition of fluid to or from each conduit 9 and its respective chamber 1 opening.

Figure 2:
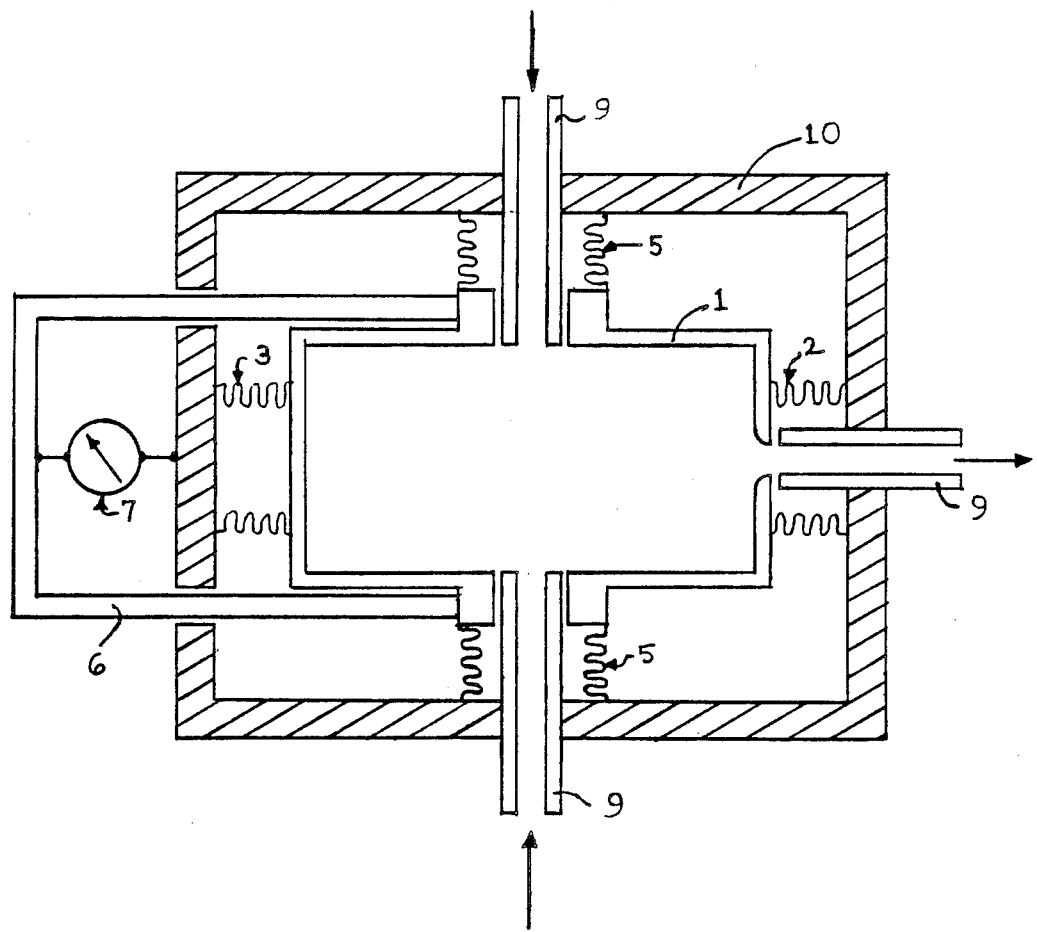
FIG. 2 is a horizontal sectional view of a meter.

In the best mode of carrying out the invention, rigid link 6 consists of a U-shaped bar oriented so that it is coplanar with the centerline plane of inlet and outlet openings as shown in FIG. 2. Each end of rigid link 6 is connected to chamber 1. These connection points are so located as to minimize relative motion between chamber 1 connection points and meter housing 10 resulting from any expansion of chamber 1 caused by internal pressure. As shown in FIG. 2, the connection points of rigid link 6 to chamber 1 are opposite sides and approximately at mid-length of cylindrical chamber 1.

Figure 6:
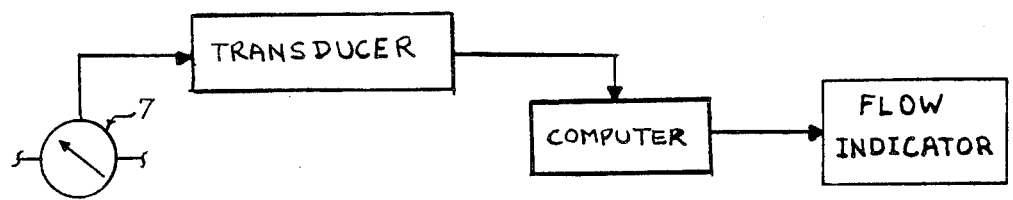
FIG. 6 is a schematic of means for indicating the flow rate of the fluid.

In the best mode of carrying out the invention, a force gauge 7, is connected between rigid link 6 and meter housing 10 to determine the momentum force, F, in the direction of the constant velocity profile of the flowing fluid at the control surface of chamber 1 outlet opening. FIG. 6 schematically illustrates the means connected to force gauge 7 for determining the mass flow rate. As shown in FIG. 6, a transducer is connected to the force gauge to produce signals corresponding to the movement of chamber 1 caused by momentum force, F, and the transducer is connected to a computer which calculates in a known manner from the signal received, the flow rate of the fluid passing through the flow meter so that flow rate may be read from the flow indicator connected to the computer.

In the best mode of carrying out the invention, if mass of the fluid being measured is not known, means for measuring mass of the fluid can be provided. This can be accomplished in a known manner by weighing the fluid in chamber 1.

In summary, in the best mode of carrying out the invention, fluid enters chamber 1 through inlet conduits 9 and associated expandible members 5. Fluid flows through chamber 1, exiting the outlet opening of chamber 1. If the meter uses an open cylinder 8, fluid is forced first to the end of chamber 1 opposite the outlet opening and then through the chamber to the outlet opening. A constant velocity profile of the flowing fluid is established at the outlet of the chamber. This constant velocity profile creates a momentum force on moveable chamber 1. The magnitude of this momentum force is determined by force gauge 7. If density of the fluid is not known, it can be determined by other means. The measured momentum force and measured or known density can be converted into electrical or mechanical signals and processed to calculate volumetric and mass flow rates, and other flow parameters, from the momentum equation in a commonly known manner.

While this invention has been shown and described in connection with a particular preferred embodiment, it is apparent that various changes and modifications, in addition to those mentioned above, may be made by those who are skilled in the art without departing from the basic features of the invention. Accordingly, it is the intention of the applicant to protect all variations and modifications within the true spirit and valid scope of this invention.

I claim:

1. A flow meter for measuring the mass flow of a fluid comprising:
   a chamber, having at least one inlet opening and at least one outlet opening, the inlet opening being essentially perpendicular to the outlet opening, the outlet opening being a curved funnel in shape, the chamber having a substantially larger cross-sectional inside area than the inlet opening, whereby a constant velocity profile of the fluid is formed at the outlet opening:
   a meter housing;
   a first conduit connected to the meter housing and aligned with and arranged axially with the inlet opening;
   a second conduit connected to the meter housing and aligned with and arranged axially with the outlet opening;
   a first expandible member connected at one end to the meter housing and at the opposite end to the inlet opening, the first conduit being arranged axially within the first expandible member, so that a closed fluid path is provided from the first conduit to the inlet opening of the chamber;
   a second expandible member connected at one end to the meter housing and at the opposite end to the outlet opening, the second conduit being arranged axially within the second expandible member, so that a closed fluid path is provided from the outlet opening of the chamber to the second conduit;
   a third expandible member connected at one end to the meter housing and at the opposite end to the chamber, the third expandible member being located directly opposite the outlet opening, whereby the third expandible member in cooperation with the second expandible member allows the chamber to move in an axial direction of the outlet opening;
   means for balancing fluid pressures between the second and third expandible members;
   an actuator connected to the chamber and actuated by and related to movement of the chamber in the axial direction of the outlet opening; and
   means for determining the flow of the fluid through the chamber being responsive to the actuator.

2. A flow meter for measuring the mass flow of a fluid comprising:
   a cylindrical chamber, having at least one inlet opening on the side of the chamber and at least one outlet opening on one end of the chamber, the inlet opening being essentially perpendicular to the outlet opening, the outlet opening being a curved funnel in shape with a minimum radius of curvature of one-seventh of the diameter of the outlet opening, the chamber having a minimum inside diameter equal to the sum of twice the fluid boundary layer thickness at the outlet end of the chamber plus the diameter of the outlet opening, whereby a uniform velocity profile of the fluid is established at the outlet opening;
   a meter housing;
   a first conduit connected to the meter housing and aligned with and arranged axially with the inlet opening;
   a second conduit connected to the meter housing and aligned with and arranged axially with the outlet opening;
   a first expandible member connected at one end to the meter housing and at the opposite end to the inlet opening,
   the first conduit being arranged axially within the first expandible member, so that a closed fluid path is provided from the first conduit to the inlet opening of the chamber;

a second expandible member connected at one end to the meter housing and at the opposite end to the outlet opening, the second conduit being arranged axially within the second expandible member, so that a closed fluid path is provided from the outlet opening of the chamber to the second conduit;

a third expandible member connected at one end to the meter housing and at the opposite end to the chamber opposite the outlet opening, whereby the third expandible member in cooperation with the second expandible member allows the chamber to move in an axial direction of the outlet opening;

means for balancing fluid pressures between the second and third expandible members;

an actuator connected to the chamber and actuated by and related to movement of the chamber in the axial direction of the outlet opening; and means for determining the flow of the fluid through the chamber being responsive to the actuator.

3. The flow meter as claimed in claim 2 having at least one pair of inlet openings, the inlet openings being diametrically opposed to each other on opposite sides of the chamber.

4. The flow meter as claimed in claim 2 wherein the means for balancing fluid pressures between the second and third expandible members comprises a closed fluid path between the second and third expandible members.

5. The flow meter as claimed in claim 2 wherein the actuator comprises a rigid link connected to the chamber and a force gauge connected between the rigid link and the meter housing.

6. The flow meter as claimed in claim 5, wherein means for determining the flow of fluid through the chamber comprises a transducer means connected to the force gauge and computer means connected to the transducer means.

7. The flow meter as claimed in claim 5 wherein the rigid link comprises a U-shaped bar connected at both ends to the chamber, the force gauge being connected between the center of the U-shaped bar and the meter housing, the force gauge and U-shaped bar being located coplanar with axis of the inlet and outlet openings of the chamber.

8. The flow meter as claimed in claim 7, wherein means for determining the flow of fluid through the chamber comprises a transducer means connected to the force gauge and computer means connected to the transducer means.

9. A flow meter for measuring the mass flow of a fluid comprising:

a cylindrical chamber, having at least one inlet opening on the side of the chamber and at least one outlet opening on one end of the chamber, the inlet opening being essentially perpendicular to the outlet opening, the outlet opening being a curved funnel in shape with a minimum radius of curvature of one-seventh of the diameter of the outlet opening;

an open cylinder connected at each end to the inside ends of the chamber and arranged concentrically with the outlet opening, the open cylinder having holes around its side at the end connected to the inside end of the chamber opposite the outlet opening, the open cylinder having a minimum inside diameter equal to the sum of twice the fluid boundary layer thickness at the outlet end of the cylinder plus the diameter of the outlet opening, whereby a uniform velocity profile of the fluid is establsihed at the outlet opening;

a meter housing;

a first conduit connected to the meter housing and aligned with and arranged axially with the inlet opening;

a second conduit connected to the meter housing and aligned with and arranged axially with the outlet opening;

a first expandible member connected at one end to the meter housing and at the opposite end to the inlet opening, the first conduit being arranged axially within the first expandible member, so that a closed fluid path is provided from the first conduit to the inlet opening of the chamber;

a second expandible member connected at one end to the meter housing and at the opposite end to the outlet opening, the second conduit being arranged axially within the second expandible member, so that a closed fluid path is provided from the outlet opening of the chamber to the second conduit;

a third expandible member connected at one end to the meter housing and at the opposite end to the chamber opposite the outlet opening, whereby the third expandible member in cooperation with the second expandible member allows the chamber to move in an axial direction of the outlet opening;

means for balancing fluid pressures between the second and third expandible members;

an actuator connected to the chamber and actuated by and related to movement of the chamber in the axial direction of the outlet opening; and means for determining the flow of the fluid through the chamber being responsive to the actuator.

10. The flow meter as claimed in claim 9 having at least one pair of inlet openings, the inlet openings being diametrically opposed to each other on opposite sides of the chamber.

11. The flow meter as claimed in claim 9 wherein the means for balancing fluid pressures between the second and third expandible members comprises a closed fluid path between the second and third expandible members.

12. The flow meter as claimed in claim 9 wherein the actuator comprises a rigid link connected to the chamber and a force gauge connected between the rigid link and the meter housing.

13. The flow meter as claimed in claim 12, wherein means for determining the flow of fluid through the chamber comprises a transducer means connected to the force gauge and computer means connected to the transducer means.

14. The flow meter as claimed in claim 12 wherein the actuator comprises a U-shaped bar connected at both ends to the chamber, the force gauge being connected between the center of the U-shaped bar and the meter housing, the force gauge and U-shaped bar being located coplanar with the axis of the inlet and outlet openings of the chamber.

15. The flow meter as claimed in claim 14, wherein means for determining the flow of fluid through the chamber comprises a transducer means connected to the force gauge and computer means connected to the transducer means.

* * * * *